United States Patent [19]

Lew

[11] Patent Number: 5,257,919
[45] Date of Patent: Nov. 2, 1993

[54] DUAL REVOLVING VANE METER-MOTOR-PUMP

[76] Inventor: Hyok S. Lew, 7890 Oak St., Arvada, Colo. 80005

[21] Appl. No.: 846,698

[22] Filed: Mar. 6, 1992

[51] Int. Cl.$^5$ .................. F01C 11/00; F03C 2/02; F04C 11/00; G01F 3/06
[52] U.S. Cl. .............................. 418/7; 73/259
[58] Field of Search ........... 418/7, 13; 73/253, 259, 73/260

[56] References Cited

U.S. PATENT DOCUMENTS

| | | | |
|---|---|---|---|
| 550,328 | 11/1895 | Pukerud | 418/13 |
| 698,360 | 4/1902 | Book | 418/13 |
| 2,208,177 | 7/1940 | Barrett | 418/13 |
| 2,370,934 | 3/1945 | Brown | 418/13 |
| 4,499,764 | 2/1985 | Fiorina et al. | 73/253 |
| 5,150,612 | 9/1992 | Lew | 73/253 |

FOREIGN PATENT DOCUMENTS 1105430 4/1961 Fed. Rep. of Germany .......... 418/7

*Primary Examiner*—John J. Vrablik

[57] ABSTRACT

A positive displacement fluid handling apparatus comprises a pair of cylindrical cavities with circular cylindrical walls connected to one another by a connecting flow passage and respectively open to an inlet and an outlet flow passages, wherein each of the two cylindrical cavities includes a hub coaxially and rotatably disposed therein and a vane radially extending from the hub to the circular cylindrical wall of the cylindrical cavity, and a hollow circular cylindrical shell encircling the hub disposed eccentrically therein tangentially to the cylindrical wall of the cylindrical cavity and rotatably about the central axis of the hollow circular cylindrical shell that includes an axially disposed slit engaged by the vane in a sliding relationship; wherein the rotating motions of the two hubs respectively included in the two cylindrical cavities are positively coupled to one another in such a way that the two vanes respectively included in the two cylindrical cavities revolve at the same speed and the radial edge of at least one of the two vanes slides on an unbroken portion of the circular cylindrical wall of the respective cylindrical cavity at all instances.

3 Claims, 1 Drawing Sheet

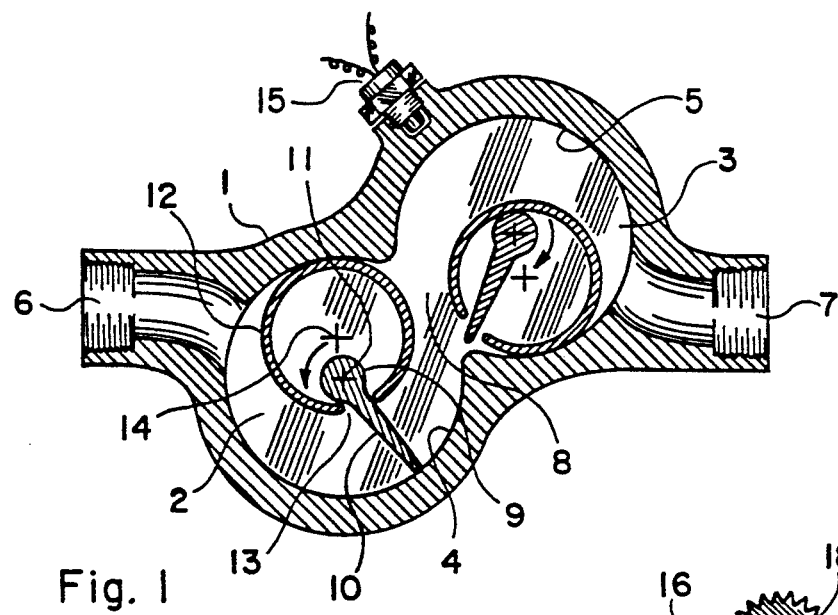
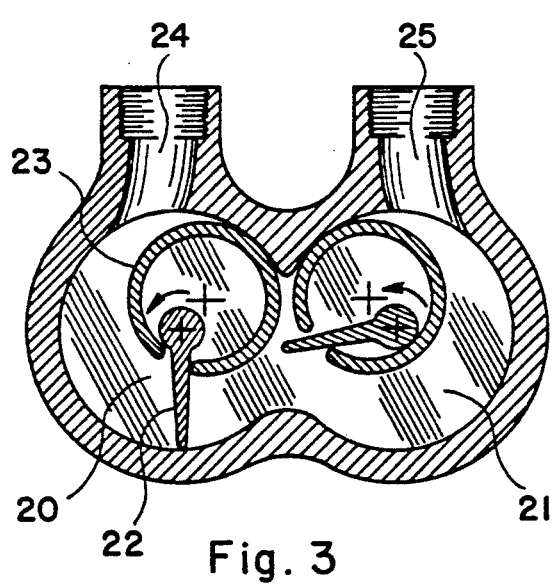
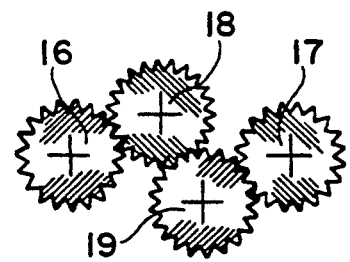
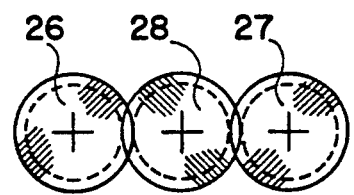
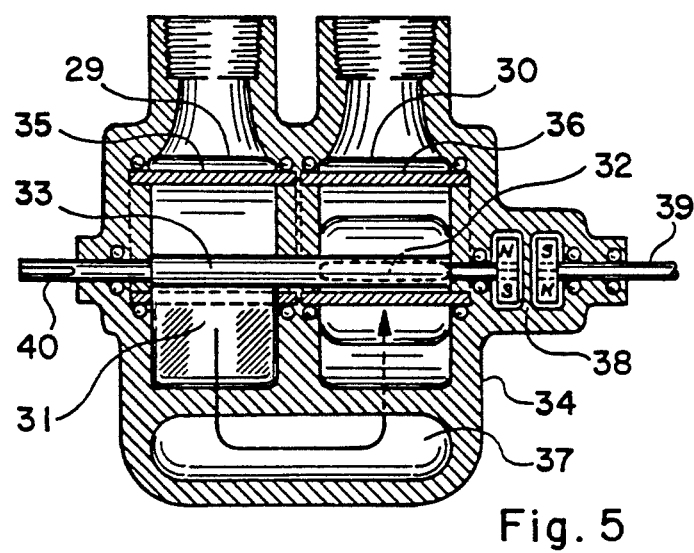
Fig. 1
Fig. 2
Fig. 3
Fig. 4
Fig. 5

DUAL REVOLVING VANE METER-MOTOR-PUMP

FIELD OF THE INVENTION

This invention relates to a positive displacement fluid handling apparatus that can be used as a flowmeter, fluid motor, or pump.

BACKGROUND OF INVENTION

There are a number of different versions of the dual revolving vane positive displacement fluid handling apparatus existing in the form of actually working devices or in the form of mere inventions disclosed in various patents. Most of these existing apparatus have flaws or deficiencies in the operating principles or in the complex designs and structures. The present invention teaches one of the simplest embodiment of the dual revolving vane positive displacement apparatus.

SUMMARY OF INVENTION

The primary object of the present invention is to provide a positive displacement apparatus comprising a pair of cylindrical cavities connected to one another by a connecting flow passage and respectively including an inlet and an outlet flow passages, wherein each of the pair of cylindrical cavities includes a vane extending from a hub disposed concentrically to and revolvably about an axis of rotation coinciding with the central axis of the circular cylindrical wall of the cylindrical cavity, wherein the radial edge of the vane slides on the circular cylindrical wall of the cylindrical cavity during revolving motion thereof, and a hollow circular cylindrical shell with an axially disposed slit through the cylindrical wall thereof disposed in an arrangement encircling the hub of the vane and rotatable about the central axis of the hollow circular cylindrical roller, which central axis is offset from the axis of rotation of the hub in such a way that the hollow circular cylindrical shell is disposed tangentially to the circular cylindrical wall of the cylindrical cavity, wherein the vane engages extends through the slit included in the hollow circular cylindrical shell in a sliding relationship. The rotating motions of the two vanes respectively included in the pair of cylindrical cavities are coupled to one another in such a way that the two vanes rotate at the same angular velocity and at least one of the two combinations of the vane and the hollow circular cylindrical roller respectively included in the pair of cylindrical cavities provides a substantially leak-proof revolving barrier separating the interior region of the pair of cylindrical cavities into two zones respectively open to the inlet and outlet flow passages at all instances during the revolving motions of the two vanes. Another object is to provide the positive displacement apparatus described in the primary object of the present invention, wherein the two vanes revolve in two opposite directions and fluid media flow through a substantially S-shaped flow passage in the apparatus.

A further object is to provide the positive displacement apparatus described in the primary object of the present invention, wherein the two vanes revolve in the same direction and fluid media flow through a substantially U-shaped flow passage in the apparatus.

Yet another object is to provide the positive displacement apparatus described in the primary object of the present invention, wherein the pair of cylindrical cavities are disposed in an in-line coaxial arrangement and the hubs of the two vanes are nonrotatably mounted on a common shaft extending coaxially through the pair of cylindrical cavities and rotatably supported by the housing of the pair of cylindrical cavities.

These and other objects of the present invention will become clear as the description thereof progresses.

DESCRIPTION OF FIGURES

The present invention may be described with a greater clarity and specificity by referring to the following figures :

FIG. 1 illustrates a cross section of an embodiment of the present invention, wherein the two vanes revolve in two opposite directions and fluid media flow through a substantially S-shaped flow passage in the apparatus.

FIG. 2 illustrates an embodiment of the rotary motion coupling means coupling revolving motions of the two vanes included in the embodiment shown in FIG. 1 in such a way that the two vanes revolve at the same speed in two opposite directions.

FIG. 3 illustrates a cross section of another embodiment of the present invention, wherein the two vanes revolve in the same direction and fluid media flow through a substantially U-shaped flow passage in the apparatus.

FIG. 4 illustrates an embodiment of the rotary motion coupling means coupling revolving motions of the two vanes included in the embodiment shown in FIG. 3 in such a way that the two vanes revolve at the same speed in the same direction.

FIG. 5 illustrates a cross section of a further embodiment of the present invention, wherein the two cylindrical cavities are disposed in an in-line coaxial arrangement and the two vanes extend from a common shaft extending through the two cylindrical cavities.

DESCRIPTION OF ILLUSTRATED EMBODIMENTS

In FIG. 1 there is illustrated a cross section of an embodiment of the positive displacement fluid handling apparatus constructed in accordance with the principles of the present invention. The housing or body 1 includes a pair of cylindrical cavities 2 and 3 respectively having circular cylindrical walls 4 and 5, and closed ends, wherein an inlet port 6 and an outlet port 7 are respectively open to the two cylindrical cavities 2 and 3 in a geometrically opposite arrangement, and a connecting flow passage 8 connects the two cylindrical cavities 2 and 3 to one another, in which arrangement, at least one half of the circular cylindrical wall of each of the two cylindrical cavities 2 and 3 is free of any recesses and holes. Each of the two cylindrical cavities 2 and 3 includes a hub 9 with a radially extending vane 10 extending therefrom to the circular cylindrical wall of the cylindrical cavity, which combination extends over the entire length of the cylindrical cavity and is supported by the body 1 revolvably about the central axis 11 of the circular cylindrical wall of the cylindrical cavity in such a way that the radial edge of the vane slides on the circular cylindrical wall of the cylindrical cavity during revolving motion thereof, and a hollow circular cylindrical shell 12 with an axially disposed slit 13, that extends over the entire length of the cylindrical cavity, supported by the body 1 in an arrangement rotatable about the roller axis 14 eccentric to the hub axis 11 and substantially tangential to the circular cylindrical wall of the cylindrical cavity. It should be noticed that the axes of the circular cylindrical shells respectively included in the two cylindrical cavities 2 and 3 are respectively disposed on the two opposite sides of a plane including the axes of rotation of the two vanes respectively included in the two cylindrical cavities 2 and 3, which arrangement provides a substantially S-shaped flow passage in the apparatus, that connects the inlet port 6 to the outlet port 7. The revolving motions of the two vanes respectively included in the two cylindrical cavities 2 and 3 are coupled to one another by gearing or other positive rotary motion coupling means in such a way that the two vanes revolve at the same speed in two opposite directions, and the radial edge of at least one of the two vanes respectively included in the two cylindrical cavities 2 and 3 slides on the unbroken portion of the circular cylindrical wall of the respective cylindrical cavity at all instances, whereby at least one of the two combinations of the vane and the hollow circular cylindrical shell respectively included in the two cylindrical cavities 2 and 3 provides a substantially leak-proof revolving barrier separating the inlet-side region within the two cavities 2 and 3 from the outlet-side region thereof and vice versa at all instances. As a consequence, the fluid media cannot flow through the substantially S-shaped flow passage in the apparatus without revolving the two vanes and vice versa. A motion sensor 15 detecting the vane passing thereby on the principles of inductive, capacitive, or optical detecting methods, measures the speed of revolution of the vane as a measure of flow rate of fluid media moving through the apparatus. When the apparatus is used as a fluid motor or pump, one of the two shafts respectively supporting the two hubs of the two vanes should extend through and out of the housing or body 1 for delivering power to the combination of the two hubs of the two vanes or taking it off therefrom.

In FIG. 2 there is illustrated an embodiment of the rotary motion coupling means that couples revolving motions of the two vanes respectively included in the two cylindrical cavities 2 and 3 in the embodiment shown in FIG. 1. The two identical gears 16 and 17 are respectively affixed coaxially to the two hubs of the two vanes respectively included in the two cylindrical cavities 2 and 3, while the two identical idler gears 18 and 19 are disposed in a freely rotatable arrangement, wherein the two gears 16 and 17 rotate at the same speed in two opposite directions. When the size of the positive displacement apparatus shown in FIG. 1 is small and the separation distance between the axes of rotation of the two vanes is small, the idler gears 18 and 19 can be omitted and the two gears 16 and 17 should engage one another directly. Of course, an appropriate phase angle difference between the revolving motions of the two vanes must be included in the gearing whereby the radial edge of at least one of the two vanes respectively included in the two cylindrical cavities 2 and 3 slides on the unbroken portion of the circular cylindrical wall of the respective cylindrical cavity at all instances. It should be understood that other means for positively coupling the rotary motions such as the timing belt, roller chain, etc. may be employed in place of the gearing shown in the particular illustrative embodiment.

In FIG. 3 there is illustrated a cross section of another embodiment of the positive displacement fluid handling apparatus constructed in accordance with the principles of the present invention. This embodiment includes two cylindrical cavities 20 and 21 respectively having circular cylindrical walls, and two combinations of the revolving vane 22 and the hollow circular cylindrical shell 23 respectively included in the two cylindrical cavities 20 and 21 in an arrangement similar to that described in conjunction with FIG. 1 with one exception, that is the planar symmetric placing of the combinations of the vane and the hollow circular cylindrical roller, wherein the first combination thereof included in the first cylindrical cavity 20 and the second combination thereof included in the second cylindrical cavity 21 are disposed in a planar symmetric arrangement about a plane perpendicular to a plane including the central axes of the two cylindrical cavities 20 and 21. It should be noticed that, in the embodiment shown in FIG. 1, the two combinations of the vane and the hollow circular cylindrical shell are disposed in an axisymmetric arrangement about an axis located on a plane including the central axes of the two cylindrical cavities 2 and 3 in a parallel relationship to those central axes. It should be further noticed that the axes of the hollow circular cylindrical shells are disposed on one side of a plane including the central axes of the two cylindrical cavities 20 and 21 in the embodiment shown in FIG. 3, while those axes are disposed on the two opposite side of the aforementioned plane in the embodiment shown in FIG. 1. The inlet port 24 open to the first cylindrical cavity 20 and the outlet port 25 open to the second cylindrical cavity 21 are respectively disposed on two opposite sides of the two combinations of the vane and the hollow circular cylindrical shell, wherein the inlet and outlet ports 24 and 25 are connected to one another by a substantially U-shaped flow passage in the apparatus. The revolving motions of the two vanes respectively included in the two cylindrical cavities 20 and 21 are coupled to one another in such a way that the two vanes revolve at the same speed in the same direction.

In FIG. 4 there is illustrated an embodiment of the rotary motion coupling means coupling revolving motions of the two vanes respectively included in the two cylindrical cavities 20 and 21 shown in FIG. 3. Two identical gears 26 and 27 respectively affixed coaxially to the two hubs of the two vanes respectively included in the two cylindrical cavities 20 and 21 engage one another by means of an idler gear 28, whereby the two vanes revolve at the same speed in the same direction.

In FIG. 5 there is illustrated a cross section of a further embodiment of the positive displacement fluid handling apparatus of the present invention, that is a modified version of the embodiment shown in FIG. 1 or 3. The two cylindrical cavities 29 and 30 are disposed in an in-line coaxial arrangement, and the two vanes 31 and 32 respectively included in the two cylindrical cavities 29 and 30 extend from a common shaft 33 extending over the entire lengths of the two cylindrical cavities 29 and 30 in an coaxial arrangement and rotatably supported by the housing or body 34. When the axes of two hollow circular cylindrical shells 35 and 36 are disposed on one side of a plane including the central axis of the common shaft 33, and the connecting flow passage 37 extends between one half of the first cylindrical cavity 29 located on one side of a plane including the central axis of the common shaft 33 and one half of the second cylindrical cavity 30 located on the other side of the aforementioned plane opposite to said one side, as shown in the particular illustrative embodiment shown in FIG. 5, the apparatus operates like the embodiment shown in FIG. 3. Of course, in this particular embodiment, the inlet and outlet ports are disposed on one side of another plane including the central axis of the common shaft 33. When the central axes of the two hollow circular cylindrical shells respectively included in the two cylindrical cavities are respectively disposed on the two opposite sides of a plane including the central axis of the common shaft, and the connecting flow passage extends between the respective halves of the two cylindrical cavities located on the same side of a plane including the central axis of the common shaft, wherein the inlet and outlet ports are disposed in a diametrically opposite arrangement across the common shaft, the apparatus operates like the embodiment shown in FIG. 1. A magnetic rotary motion coupling 38 with an r.p.m. output shaft 39 connected to an r.p.m. counter, may be employed in place of the motion sensor 15 included in the embodiment shown in FIG. 1, that measures the revolving speed of the vanes as a measure of flow rate of fluid media moving through the apparatus. When the apparatus is used as a pump or fluid motor, the power shaft 40 extending coaxially from the common shaft 33 through and out of the housing or body 34 transmits torque from and to the two vanes 31 and 32. When the apparatus is used as a flowmeter, the power shaft 40 should be omitted and the common shaft 33 should be terminated with the housing or body 34.

It should be understood that the hollow circular cylindrical rollers included in the embodiments shown in FIGS. 1, 3 and 5 may extend into shallow recesses included in the circular cylindrical walls of the respective cylindrical cavities in place of the tangential arrangements shown in the illustrative embodiments, as long as the inner cylindrical surface of the hollow circular cylindrical shell is disposed interiorly to the circular cylindrical wall of the cylindrical cavity and the vane does not disengage the slit included in the hollow circular cylindrical shell during the revolution of the vane.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to those particular illustrative embodiments shown and described, and accordingly, all suitable modifications and equivalents may be regarded as falling within the scope of the invention as defined by the claims which follow.

The embodiments of the invention, in which an exclusive property or privilege is claimed, are defined as follows:

1. An apparatus for executing a function related to fluid flow comprising in combination:
   a) a body including a first and second cylindrical cavities with closed ends and connected to one another by a connecting flow passage, wherein at least a major portion of cylindrical wall of each of the first and second cylindrical cavities substantially coincides with a first circular cylindrical surface of a first diameter;
   b) each of the first and second cylindrical cavities including a vane extending from a hub and terminated at said first circular cylindrical surface disposed therein rotatably about the central axis of said first circular cylindrical surface, wherein radial edge of the vane slides on the circular cylindrical wall of the cylindrical cavity, and a cylindrical shell with an outer cylindrical surface substantially coinciding with a second circular cylindrical surface of a second diameter disposed therein rotatably about the central axis of the second circular cylindrical surface located parallel to and offset from the central axis of said first circular cylindrical surface, wherein the cylindrical shell is disposed within the cylindrical cavity as said second diameter is smaller than said first diameter and the hub of the vane is disposed within the cylindrical shell; wherein the outer cylindrical surface of the cylindrical shell and the cylindrical wall of the cylindrical cavity are disposed at a close proximity to one another over a tangential portion of the combination thereof, and the cylindrical shell includes an axially disposed slit engaged by the vane in a sliding relationship; and the first and second cylindrical cavities are disposed respectively on two opposite sides of a plane located intermediate the central axes of the first and second cylindrical cavities in a parallel relationship to one another, and the central axes of the two cylindrical shells respectively disposed in the first and second cylindrical cavities are located respectively on two opposite sides of a plane defined by the central axes of the first and second cylindrical cavities;
   c) a first port open to the first cylindrical cavity through a portion of the cylindrical wall thereof spaced from the connecting flow passage, and a second port open to the second cylindrical cavity through a portion of the cylindrical wall thereof spaced from the connecting flow passage; wherein combination of the first port, a cylindrical space between the cylindrical wall of the first cylindrical cavity and the cylindrical shell disposed in the first cylindrical cavity, the connecting flow passage, a cylindrical space between the cylindrical wall of the second cylindrical cavity and the cylindrical shell disposed in the second cylindrical cavity, and the second port provides a flow passage extending through the body, and fluid moving through the connecting flow passage moves across the plane defined by the central axes of the first and second cylindrical cavities; and
   d) means for coupling revolving motions of the two vanes respectively included in the first and second cylindrical cavities in such a way that the two vane revolve at the same angular speed in two opposite directions, and at least one of the two vanes substantially blocks said flow passage at all instants whereby motion of fluid moving through said flow passage creates revolving motions of the two vanes and vice versa.

2. An apparatus as defined in claim 1 wherein said combination includes means for measuring revolving speed of at least one of the two vanes as a measure of flow rate of fluid moving through said flow passage.

3. An apparatus as defined in claim 1 wherein said combination includes a power shaft extending out of the body for transmitting torque to and from the combination of the two vanes.

* * * * *